Sept. 24, 1929.  V. G. VAUGHAN  1,729,561
THERMAL CONTROL SYSTEM
Filed May 6, 1926   2 Sheets-Sheet 1
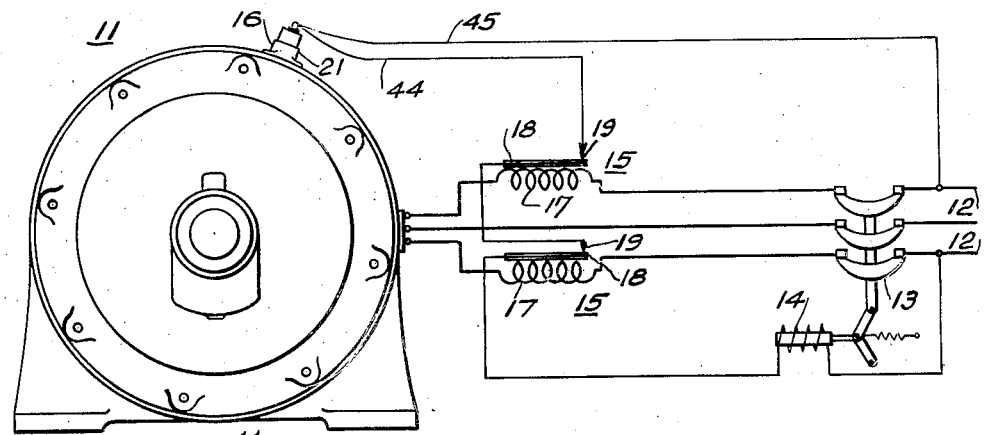
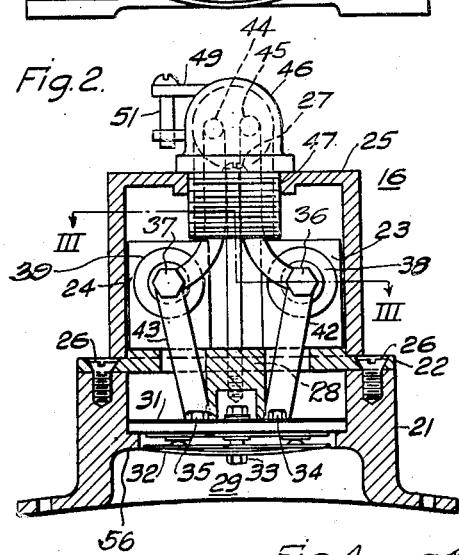
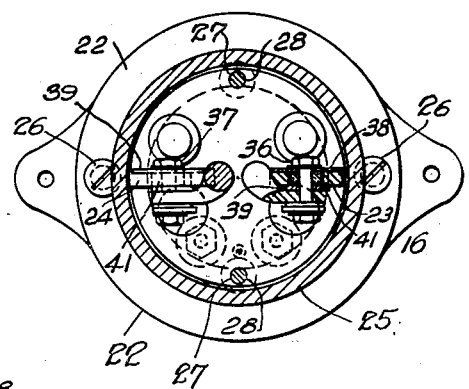
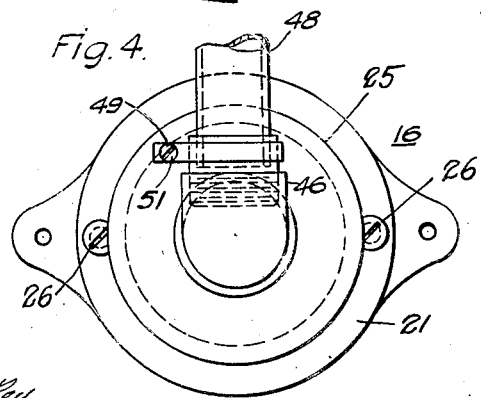
WITNESSES:
INVENTOR
Victor G. Vaughan.
BY
ATTORNEY

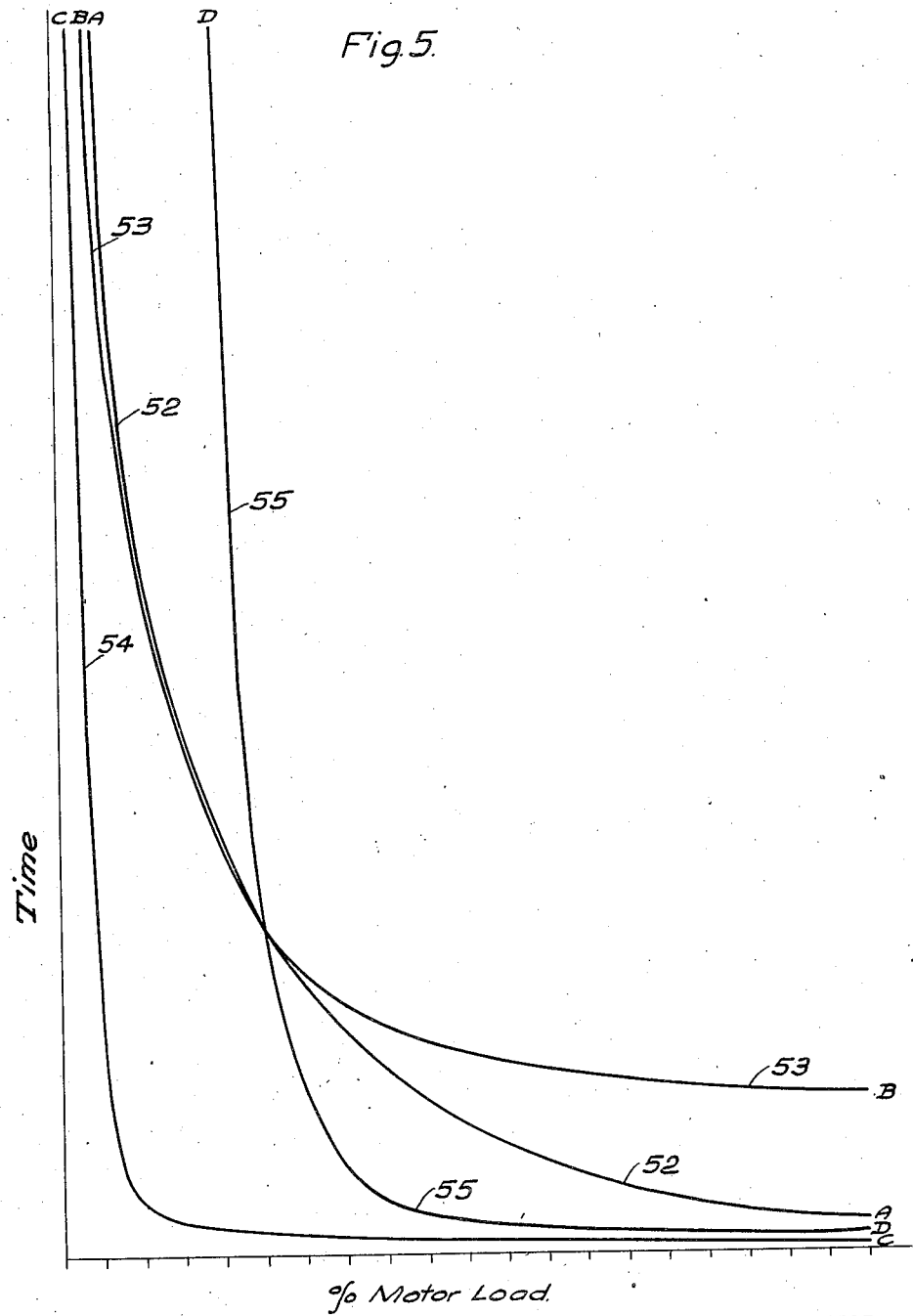

Patented Sept. 24, 1929

1,729,561

UNITED STATES PATENT OFFICE

VICTOR G. VAUGHAN, OF MANSFIELD, OHIO, ASSIGNOR TO WESTINGHOUSE ELECTRIC & MANUFACTURING COMPANY, A CORPORATION OF PENNSYLVANIA

THERMAL-CONTROL SYSTEM

Application filed May 6, 1926. Serial No. 107,306.

My invention relates to control systems and particularly to temperature control systems for energy translating devices.

An object of my invention is to provide a relatively simple and efficient temperature control system comprising a plurality of separate thermally actuable means having reciprocally relatively different times of operation above and below a predetermined load on an energy translating device.

In practicing my invention, I provide a thermally-actuable means directly operatively associated with an energy translating device, and a second thermally actuable means energized in accordance with the current traversing an energy translating device and out of thermal communication therewith, and a circuit controlling means governed by the plurality of thermally actuable means.
In the drawings, Figure 1, is a view, in side elevation, of a motor having associated therewith a thermostat embodying my invention, a schematic diagram of connections of the system being also shown.

Fig. 2 is a view, in section through a thermostatic device.

Fig. 3 is a view, in section therethrough, taken on the line III—III of Fig. 2.
Fig. 4 is a top plan view thereof, and, Fig. 5 is a set of curves illustrating the relation of over-load to times of heating of a motor and of the thermally actuable means.

Referring more particularly to Fig. 1 of the drawings, an energy translating device 11 is there illustrated as comprising an alternating current motor of usual design, which is energized from three-phase conductors 12, and an automatic circuit interrupting means 13 located in the motor energizing circuit, and provided with an actuating and holding coil 14, which is effective to hold the circuit breaker in its closed position so long as the coil is energized.
Means for interrupting an energizing circuit through the holding coil 14, comprises a plurality of thermal relays 15, one of these being connected in each of at least two of the conductors of the motor supply circuit, and a thermostat 16, of a different type, which is mounted on the motor from itself, as shown more particularly in Fig. 1 of the drawings. The thermal relays 15 may be of any type usually employed for such purposes and embodying a heating coil 17, which is traversed by the motor current of one phase, and a thermally-actuable element 18, which is provided with a contact member mounted thereon and actuated to operatively engage or be disengaged from a stationary contact member 19. So long as the current traversing the heating coil 17 is below a predetermined value, the thermal element 18 is in operative engagement with the fixed contact member 19, which may be made adjustable in a manner well known in the art.

The thermostat 16 comprises a tubular base member 21, the lower edge portion thereof being curved to permit of mounting it against the outer surface of an energy translating device 11, as shown in Fig. 1 of the drawings. An intermediate terminal-supporting member 22 is provided with a flange portion and two supporting lugs 23 and 24 extending laterally above the surface of the flange portion. A cover member 25, also of substantially tubular form is provided. The flange of the member 22 is secured against the outer portion of the base member 21 by a plurality of screws 26. The cover member 25 is held against the intermediate member 22 by a plurality of relatively long machine screws 27, the threaded ends of which fit into screw threaded openings 28 in the flange portion of the member 22.

The base member 21 is provided with an inner annular flange 56 for receiving a thermally actuable switch 29. The thermally-actuable switch 29 comprises a base 31, a bimetallic disc 32 supported by a single central stud 33 from the base 31, suitable contact members insulatedly mounted on the base 31, and contact bridging members insulatedly mounted on the disc 32 and movable therewith. A plurality of terminal members 34 and 35 are provided for the switch 29. While a particular form of thermally-actuable means is illustrated and described, the particular details of construction thereof form no part of my invention and further details of description are omitted.

A plurality of terminal members 36 and 37 are insulatedly mounted on the lugs 23 and 24 and may be of any desired construction, but are here shown as machine bolts provided with tightening nuts, insulating discs 38 and 39 being provided at each side of the supporting lugs together with a bushing 41, to properly insulate the terminal members 36 and 37 from the supporting lugs. The terminal 34 on the switch is connected by a suitable conductor 42 to terminal member 36, and a similar conductor 43 connects terminal member 35 to terminal member 37.

Means for providing an enclosed or encased entrance for a plurality of control circuit conductors 44 and 45 into the relay 16 comprises a tubular member 46, of L-shape which may either be screw threaded into a suitable central opening 47 in the cover member 25 or may be held in suspension in the same position by any other means well known in the art. A conduit member 48 may contain the two conductors 44 and 45, and an end portion of the member 46 may be clamped around the conduit 48 by a clamping member 49 and a clamping screw 51 associated therewith.

Referring more particularly to Fig. 5 of the drawings, I have there shown a number of curves which illustrate the relation of time of operation of thermal relays, or the time required for the motor to reach a predetermined temperature value, in relation to percentages of motor load values. Curve 52 illustrates the time required for a predetermined portion of an energy-translating device to reach a predetermined limiting temperature. The predetermined portion of the energy translating device is preferably the hottest portion thereof. This is necessary for the reason that an energy-translating device comprises a magnetizable material, a current-conducting material, and electric-insulating material separating the other two materials. The magnetizable material, usually iron or steel either in the form of a casting or in the form of laminations, is heated by eddy currents and hysteresis currents, while the current conducting material is traversed and heated by electric current. Heat flows from the inner portions of the energy-translating device where it is generated to other portions or parts of the translating device where the temperature is normally lower because of a loss of heat therefrom, either by radiation, conduction or convection.

The flow of heat through the iron or steel is quite different from the flow of heat through the copper. The heating effect of long continued moderate over-loads is also quite different from the heating effect of momentary heavy over-loads. It has been found to be quite difficult to provide a single thermal relay which will copy or reproduce the temperature conditions of the hottest portion of the energy translating device in order that the circuit thereof may be de-energized as soon as the temperature of the hot spot has reached an undesirably high value. The hereinbefore described difference in the effect of small or moderate over-loads and of relatively large over-loads is clearly shown in the variation of the slope of curve 52. It may be noted that a moderate over-load can be carried by an energy-translating device for a relatively long period of time without injury to the device itself, but that the length of time within which it can carry a relatively heavy overload is very much shorter.

Curve 53 illustrates the time of operation for a thermostat of the type hereinbefore described and as illustrated in Figs. 2 to 4 inclusive, and shown as being directly, operatively associated with the magnetizable material of the translating device. By a proper selection of the thermal relay 16, it is possible to have its times of operation for moderate overloads of the translating device, approach very closely the permissible times during which the translating device can be subjected to these moderate overloads. However, if the translating device is subjected to greater overloads, this type of thermostat requires too long time for operation as is shown by the right hand portion thereof extending above the right hand portion of curve 52. It is therefore highly undesirable to permit a thermostat of this type to control a translating device by itself, for, while it operates satisfactorily on moderate overloads, it will operate much too slowly on higher overloads to properly protect the translating device.

As the curves 52 and 53 are representative curves respectively obtained from actual motors and from actual thermostats, their relative position may be varied by using a different thermostat. Thus if curve 53 be shifted toward the left, i. e. if a thermostat is used which reaches a predetermined temperature in a shorter time, the point of crossing of the two curves is shifted. The part of the curve to the left of the crossing point will be located a larger distance below curve 52. This means that the thermostat would cause de-energization of the motor sooner than is necessary. Stated in another way the motor would be de-energized before reaching the maximum permissible temperature, and the motor would not be operated at its maximum permissible capacity.

To provide the desired protection on the higher overloads, I provide a different type of thermally-actuable means described in connection with the relays 15. If a relay of this type be employed, having a normal rating substantially the same as the normal rating of the translating device, it will operate much slower than is desirable, and curve 54 illustrates such a curve. That is, if the normal current per phase of the translating device 11 be, say, ten amperes, and if the normal rating of the thermal relay 15 be also ten amperes, the thermal relay would operate too soon as is shown by the fact that curve 54 is located below the curve 52 throughout its entire length. I therefore employ a thermal relay which is normally rated for substantially twenty amperes, that is, I employ a thermal relay 15 which has a normal rating, that is much higher than that of the translating device. Curve 55 illustrates the time of operation of such a thermal relay and it may be noted that for moderate overloads the times of operation thereof, are above the values desired shown in curve 52. For higher overloads over a predetermined load value, the times of operation are either below those of curve 52 or approach these values very closely.

The result of the operation of a relay having a time load curve as shown in curve 55 is that it will not operate in time to interrupt the control circuit of the coil 14 for overloads below that value at which curves 52, 53 and 55 cross. This load value is slightly above 200% normal motor load in the curves shown in Fig. 5, but may be varied by employing thermostats and thermal relays of different thermal characteristics so that any desired combination of time temperature operating characteristics of the control system may be obtained.

It will be noted that that part of curve 55 below the crossing point is located a relatively large distance below the lower part of curve 52. This means that the thermal relays have a shorter time of operation, for a predetermined heavy overload, than is required for the motor or energy-translating device to reach a predetermined high temperature necessitating its de-energization. In other words, the energy-translating device is de-energized well before it reaches a dangerously high temperature. This is a highly desirable feature of the system embodying my invention as it operates to surely protect the energy-translating device which is heated very rapidly by the relatively high overload current traversing its windings. Because of this rapid heating of the energy-translating device, an additional few minutes of operation at the high overload would cause a burn-out. By providing a thermal relay which effects de-energization of the energy translating device sooner than demanded by the hot spot temperature. The device is adequately protected and can be kept in operation.

Hence, by the use of a plurality of thermally-actuable means of different types of construction, which are connected in series circuit relatively to each other and to the actuating or holding coil of a circuit controlling device, I find it possible to reproduce the thermal conditions of the hot spot of a translating device within very close limits and to protect the device adequately under all conditions of operation. As all or the thermally-actuable means have their co-operating contact members connected in series with each other, the control circuit will be interrupted upon operation of any one of the thermally-actuable means.

Thus by the use of a thermostat directly operatively associated with an iron portion of an energy-translating device and one or more current-energized and actuated relays, I find it possible to properly protect an energy-translating device under substantially all conditions of operation. It is obvious that one current-energized relay 15 alone will provide the proper protection, provided that there is no interruption in one of the phases of the circuit. It is preferable to provide at least two of these thermal relays in order to give further protection against phase failure in one of the phases.

If, for instance, two thermal relays 15 are provided as shown in Fig. 1 of the drawings, and if the circuit through the uppermost supply circuit conductor were to be interrupted, a relatively large current would flow through the two remaining conductors, the motors operating as a single phase motor. The excessive current traversing the motor would also traverse the heating coil 17 still in circuit and would cause operation of that relay within the proper time to prevent injury to the motor.

The use of a plurality of separate thermally-actuable means having reciprocally relatively different times of operation above and below a predetermined load on an energy translating device with which they are operatively associated, permits of reproducing the temperature conditions of selected portions of an energy-translating device under all conditions of operation occurring in actual practice, both normal and abnormal. The thermostat in direct operative engagement with the core or iron portion of the translating device may be made effective to reproduce the temperature conditions of the magnetizable material and therefore to protect it against undue temperature rise in that portion of the translating device. Thermal relays energized in accordance with current traversing them and the translating device, are effective to reproduce the temperature conditions in the windings of the translating device and are therefore effective to protect against undue temperature rise in the winding of an energy-translating device with which the relays are associated.

Various modifications may be made in the control system embodying my invention without departing from the spirit and scope thereof, and I desire that only such limitations shall be placed thereon as are imposed by the prior art.

I claim as my invention:

1. In a thermal control system for an energy-translating device comprising magnetic and electric conducting postions, the combination with a circuit controlling means for said device, of a plurality of thermally-actuable means having reciprocally relatively different times of operation above and below a predetermined load on the energy-translating device for governing said circuit controlling means, one of said thermally-actuable means being responsive to and energized in accordance with the thermal condition of the magnetic conducting portion and actuating said circuit-controlling means up to a predetermined load on the energy translating device, and the other of said thermally-actuable means being energized in accordance with the current traversing the electric conducting portion and actuating said circuit controlling means above the predetermined load.

2. In a thermal control system for an energy-translating device, the combination with a circuit controlling means for the device, of a plurality of thermally-actuable means having reciprocally relatively different times of operation above and below a predetermined load on an energy-translating device for governing said circuit controlling means, one of said thermally-actuable means being directly thermally related to the energy-translating device and governing said circuit controlling means up to the predetermined load, and a second thermally-actuable means being out of thermal relation with said translating device and effective to govern the circuit controlling means above the predetermined load.

In testimony whereof, I have hereunto subscribed my name this 28th day of April, 1926.

VICTOR G. VAUGHAN.